US006522779B2

(12) United States Patent
Pass et al.

(10) Patent No.: US 6,522,779 B2
(45) Date of Patent: Feb. 18, 2003

(54) REPRESENTING AN IMAGE WITH A POSTERIZED JOINT HISTOGRAM

(75) Inventors: Gregory S. Pass, Gaithersburg, MD (US); Frank Wood, Lowpoint, IL (US)

(73) Assignee: America Online, Inc., Dulles, VA (US)

( * ) Notice: Subject to any disclaimer, the term of this patent is extended or adjusted under 35 U.S.C. 154(b) by 92 days.

(21) Appl. No.: 09/749,628

(22) Filed: Dec. 28, 2000

(65) Prior Publication Data

US 2002/0102021 A1 Aug. 1, 2002

Related U.S. Application Data

(60) Provisional application No. 60/255,399, filed on Dec. 15, 2000.

(51) Int. Cl.[7] .................................................. G06K 9/00
(52) U.S. Cl. ............................ 382/170; 382/305; 707/6
(58) Field of Search ................................ 382/218, 209, 382/219–220, 168, 170, 162, 165, 305, 108, 224; 358/403, 522, 518; 345/700, 738, 835, 788, 419, 589; 348/405.1; 707/1–6, 404.1, 520–522, 515–516

(56) References Cited

U.S. PATENT DOCUMENTS

| | | | |
|---|---|---|---|
| 5,049,986 A | 9/1991 | Aono et al. | 358/522 |
| 5,226,175 A | 7/1993 | Deutsch et al. | 345/419 |
| 5,404,435 A | 4/1995 | Rosenbaum | |
| 5,559,899 A | 9/1996 | Schmidt | 382/224 |
| 5,579,471 A * | 11/1996 | Barber et al. | 345/700 |
| 5,623,681 A | 4/1997 | Rivette et al. | |
| 5,857,033 A | 1/1999 | Kim | 382/168 |
| 5,933,194 A | 8/1999 | Kim et al. | 348/403.1 |
| 5,949,556 A | 9/1999 | Tamai | 358/518 |
| 6,181,817 B1 | 1/2001 | Zabihn et al. | 382/170 |
| 6,243,713 B1 * | 6/2001 | Nelson et al. | 707/104 |
| 6,295,533 B2 | 9/2001 | Cohen | |
| 2001/0028739 A1 * | 10/2001 | Lee et al. | 382/165 |

OTHER PUBLICATIONS

Pass et al., "Comparing Images Using Joint Histograms," Multimedia Systems 7(3): 234–240 (1999).

* cited by examiner

Primary Examiner—Phucc Tran
Assistant Examiner—Ishrat Sheral
(74) Attorney, Agent, or Firm—Fish & Richardson P.C.

(57) ABSTRACT

Representing an image includes extracting information reflecting one or more characteristics of an image that then is used to compute a first histogram vector. The first histogram vector includes one or more vector elements, each representing information for a different characteristic extracted about the image. Multiple subsets are identified within at least one of the vector elements included in the first histogram vector and a second histogram is created. The second histogram vector includes a vector element for each of the subsets identified within the vector elements included in the first histogram vector. Data within the vector elements of the second histogram vector represents the extracted image characteristics.

48 Claims, 8 Drawing Sheets

400

| | | |
|---|---|---|
| R-nb | R-nb | B-nb |
| R-nb | Rb | G-nb |
| B-nb | G-nb | B-nb |

410 (rows)

REPRESENTING AN IMAGE WITH A POSTERIZED JOINT HISTOGRAM

This application claims priority from U.S. Provisional Application Serial No. 60/255,399, filed Dec. 15, 2000, titled "Image Searching Techniques," which is incorporated by reference.

TECHNICAL FIELD

This invention relates to representing an image.

BACKGROUND

The process of finding and retrieving images stored on electronic media (e.g., a computer, the Internet) has become increasingly difficult for a variety of reasons. For instance, with the explosive growth of the Internet, the number of searchable images available on the Internet has dramatically increased. With the increased number of images, the abilities of conventional systems, methods, and computer programs to perform searching and retrieval functions in an efficient, useful, and timely manner have been challenged.

The ability of conventional systems, methods, and computer programs to efficiently find and retrieve desired images in a database has been hampered by poor organization and inconsistent formatting of the images being searched and/or retrieved. Similar problems also may be experienced by other electronic applications involving a large quantity of images that may be searched for and retrieved. These problems may be compounded when the desired search result includes multiple formats (e.g., images and text).

SUMMARY

In one general aspect, representing an image includes extracting information reflecting one or more characteristics of the image, and using the information to compute a first histogram vector. The first histogram vector includes one or more vector elements, each representing information for a different characteristic extracted about the image. Multiple subsets are identified within at least one of the vector elements included in the first histogram vector and a second histogram vector is created. The second histogram vector includes a vector element for each of the subsets identified within the vector elements included in the first histogram vector. Data within the vector elements of the second histogram vector represent the extracted image characteristics.

Implementations may include one or more of the following features. For example, the first histogram vector may be computed based on the extracted information. The first histogram vector may include one or more vector elements, each representing information for a different combination of characteristics extracted about the image. Representing an image may further include applying a weighting factor to the first histogram vector.

In another general aspect, representing an image includes extracting information about the image, computing a histogram based on the extracted information, and calculating a posterized histogram based on the computed histogram.

Implementations may include one or more of the following features. For example, the extracted information may include more than one type of information about the image. The more than one type of information may be used to compute a joint histogram from which the posterized joint histogram may be calculated.

Representing an image also may include applying a weighting factor to a selected vector element value in the joint histogram based on at least one type of information extracted about the image before the posterized joint histogram is calculated, such that the joint histogram represents a weighted joint histogram. The posterized joint histogram may be calculated based on the weighted joint histogram. The weighting factor also may be applied to the joint histogram based on more than one type of information extracted about the image.

Applying the weighting factor may include extracting one or more additional types of information about the image that differ from the types of information used to compute the histogram. The additional types of information may be used to determine whether to modify the vector element value in the joint histogram, which includes one or more vector elements. The additional types of information may include a centeredness feature about each pixel in the image that may be used to determine whether to modify the one or more vector element values in the joint histogram.

Additionally or alternatively, representing an image may include applying a weighting factor to a selected vector element value in the joint histogram based on at least one type of information extracted about the image that differs from the types of information used to compute the joint histogram before calculating the posterized joint histogram. The joint histogram represents a weighted joint histogram that reflects application of the weighting factor. The posterized joint histogram may be calculated based on the weighted joint histogram. The weighting factor may be based on more than one type of information extracted about the image that differs from the types of information used to compute the joint histogram.

The information extracted from the image may include at least one of color, edge density, texturedness, gradient magnitude, and rank features about pixels in the image. Additionally or alternatively, the information extracted from the image may include more than one of the above listed features.

Computing the histogram may include computing a first histogram vector based on information extracted about the image. The first histogram vector may include one or more vector elements, each representing information for a different feature extracted about the image. Additionally or alternatively, the first histogram vector may include one or more vector elements each representing information for a different combination of features extracted about the image.

Calculating a posterized histogram may include identifying multiple subsets within at least one of the vector elements included in the first histogram vector and creating a second histogram vector that includes a vector element for each of the subsets identified within the vector elements included in the first histogram vector. The data within the vector elements of the second histogram vector represent the extracted image features.

In yet another general aspect, a representation of at least a portion of an image includes a first element, which includes data indicating whether the image includes a range of weights corresponding to a first feature. The representation also includes a second element, that differs from the first element, which includes data indicating whether the image includes a range of weights corresponding to a second feature.

Implementations may include one or more of the following features. For example, the data included in the first and second elements may be binary.

In still another general aspect, a representation of at least a portion of an image includes a first element, which includes data indicating whether the image includes a range of weights corresponding to a first combination of features. The representation also includes a second element, that differs from the first element, which includes data indicating whether the image includes a range of weights corresponding to a second combination of features.

Implementations may include one or more of the following features. For example, the data included in the first and second elements may be binary.

These general and specific aspects may be implemented using a system, a method, or a computer program, or any combination of systems, methods, and computer programs.

Other features and advantages will be apparent from the description and drawings, and from the claims.

DESCRIPTION OF DRAWINGS

FIG. 4. is a block diagram of a portion of an image.

FIG. 5 is a joint histogram vector of the image portion of FIG. 4.

FIG. 7b illustrates a joint histogram vector corresponding to the joint histogram graph of FIG. 7a.

Like reference symbols in the various drawings indicate like elements.

DETAILED DESCRIPTION

Figure 1:
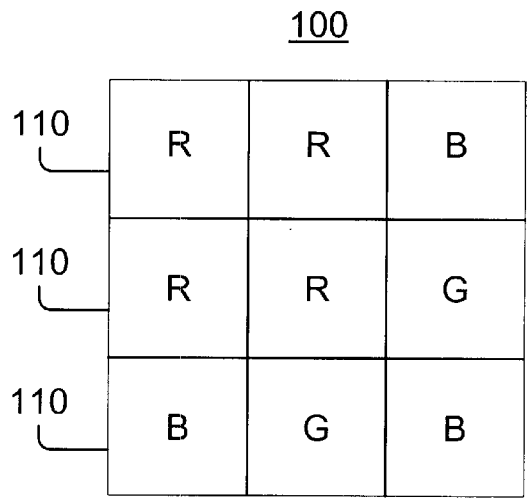
FIG. 1 is a block diagram of a portion of an image.

Referring to FIG. 1, a portion of an image 100 may be divided into picture elements (pixels) 10. In this example, the displayed portion of the image 100 includes nine pixels 110. In general, an image 100 may be divided into any number of pixels 110. A higher number of pixels 110 typically correlates to a finer image resolution. A pixel 110 is generally used as the basic unit of programmable color in an image 100. The color of a pixel 110 may be based on any number of colors used in a colorspace, e.g., the standard RGB colorspace. For purposes of illustration, FIG. 1 includes three colors: red (R), green (G), and blue (B).

A pixel 110 also may include other features in addition to color. Thus, each pixel 110 in an image 100 may be characterized by one or more features. Other features in addition to color may include, for example, edge density, texturedness, gradient magnitude, rank, and brightness. The edge density at a particular pixel 110 may be defined as the ratio of edges to pixels 110 in a small neighborhood surrounding the pixel 110. The texturedness at a particular pixel 110 may be defined as the number of neighboring pixels 110 whose intensities differ from the particular pixel 110 by more than a fixed value. The gradient magnitude at a particular pixel 110 may be defined as a measure of how rapidly intensity is changing in the direction of greatest change. The rank of a particular pixel 110 may be defined as the number of pixels 110 in the local neighborhood whose intensity is less than the intensity of the particular pixel 110. In general, these features, including color, are likely to exhibit invariance to changes among similar images, which may be useful when conducting a search for, e.g., similar images, or transitions between images.

An image 100 may be represented in different ways. For example, information may be extracted from the image 100, such as the features described above. Extracting the information may be accomplished by any number of techniques or combinations of techniques including extracting the information for each pixel 110 in an image 100, every other pixel 110 in the image 100, every nth pixel 110 in the image 100, or one or more selected blocks of pixels 110. For example, in one implementation, the information for every pixel 110 in the image 100 is extracted. Some information may be extracted for some pixels, some information may be extracted for no pixels, and some information may be extracted for areas of pixels. Extracting the information is generally accomplished based on predefined criteria, an algorithm or algorithms, or any combination of these. These and other predefined criteria and/or algorithms may be embodied in computer software and performed by a computer.

The extracted information may be used to compute a histogram that is representative of the image 100. Generally, a histogram is a one-dimensional representation of the image that may be created using one extracted feature. For example, if color is the extracted feature used to create the histogram, the histogram may be called a color histogram. Representing an image as a histogram may be useful as part of an image retrieval process or otherwise.

Figure 2:
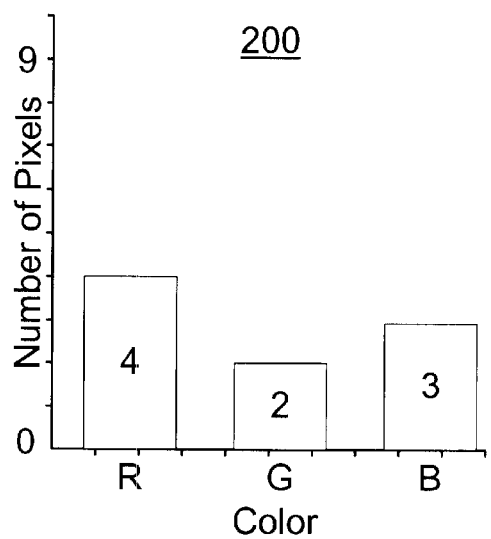
FIG. 2 is a histogram graph of the image portion of FIG. 1.

As illustrated in FIG. 2, image 100 (FIG. 1) may be expressed as a histogram, which is depicted as a one-dimensional graph 200. The horizontal axis represents the extracted pixel feature which includes the colors red, green, and blue in this example. The vertical axis represents a total number of pixels 110 in the image 100, in this example, nine. The graph may be created by evaluating each pixel 110 in image 100, extracting the color information for each pixel 110, and incrementing a count in the appropriate color position(s) on the graph 200 corresponding to the extracted color information. Thus, as the graph 200 illustrates, image 100 includes four red pixels, two green pixels, and three blue pixels.

As shown, the features of image 100 are shown as having mutually exclusive characteristics. However, the extracted pixel features and pixel characteristics need not be mutually exclusive. Rather, one pixel may include red and green characteristics, such that it is effectively counted twice, or some weighting factor may be applied to discount the shared characteristic.

Figure 3:
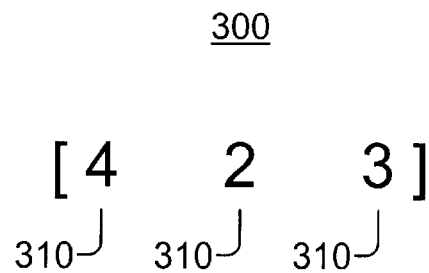
FIG. 3 is a histogram vector of the image portion of FIG. 1.

As shown in FIG. 3, in addition to expressing the histogram as a graph, the histogram also may be expressed as a histogram vector 300. The histogram vector 300 includes a vector element 310 corresponding to each extracted feature. In general, a histogram vector 300 may include any number of vector elements 310, which correspond to the number of particular features being extracted from within an image 100. For example, if color is the extracted feature and the color feature includes up to 256 possible colors, then the histogram vector may include one vector element 310 for each of the 256 possible colors.

Each vector element 310 typically represents a number of pixels 110 in the image 100 that include the feature value represented by that vector element 310. For example, in FIG. 3, the histogram vector 300 includes one vector element 310 for each color, where each vector element 310 represents the number of pixels of a given color in the image 300. The histogram vector 300 may be computed by extracting the color information about each pixel 110 and incrementing a count in the appropriate color vector element(s) 310 corresponding to the extracted color information.

A histogram may be computed by systematically evaluating each pixel of an image to determine the feature value or values that the particular pixels represent. Thus, in this instance, the histogram 200 and the histogram vector 300 may be used to represent the portion of the image 100. Computing the histogram may be accomplished by computer software, which includes an algorithm that is performed by a computer, or otherwise.

As stated above, other features may be extracted about each pixel, such as texture or centeredness. Like color in the histogram discussed above, these other features may be used to create a histogram vector.

When more than one type of information is extracted about an image, a multi-dimensional histogram, which is typically referred to as a joint histogram, may be computed. FIG. 4 illustrates a portion of an image 400, where each pixel 410 in the image 400 is represented by two features, namely a color feature and a brightness feature. In this example, each pixel 410 is evaluated to determine whether it may be represented by at least one of three colors and whether it may be represented as either bright (b) or non-bright (nb).

In general, a joint histogram is more descriptive of an image than the single-feature histogram described with reference to FIG. 2. FIG. 5 illustrates that the portion of the image 400 shown by FIG. 4 may be expressed as a joint histogram vector 520, 530. The joint histogram vector 520 may include a distinct vector element 510 corresponding to each possible combination of joint features within pixels 410. For example, if two features are extracted about each pixel 410 of an image 400, such as the color information (R,G,B) and brightness information (b, nb) shown by FIG. 4, then each pixel 410 may be represented by a combination of color and brightness. Six possible combinations of joint features exist when three values of color (R, G, B) are combined with two values of brightness (b, nb). The joint histogram vector 520 corresponding to the portion of image 400, therefore, may include vector elements 510 for each of the six possible combinations of the color and brightness features. Each joint feature corresponds to a vector element 510 within the joint histogram vector 520. This example illustrates that although five individual features (R,G,B, b, nb) of image 400 are represented, a joint histogram 520 generally increases dimensionality of the typical one-dimensional histogram space by using more than five vector elements 510 to represent the image 400 based on those five individual features.

Each vector element 510 in a joint histogram vector 530 typically includes the number of pixels in the image that are described by a particular combination of joint features. For example, each vector element 510 in joint histogram 530 may be used to represent the total number of pixels 410 included in image 400 corresponding to a particular color-brightness combination.

The joint histogram vector 520, 530 for an image 400 also may be used to represent more than two features extracted about each pixel 410 in the image 400. For example, if six features in each pixel 410 are being represented by a particular joint histogram 520, and if each feature has a range of four values (e.g., the color feature may have red, green, blue, and yellow values), then the joint histogram vector 520 may include 4096 vector elements 510.

Applying a Weighting Factor to a Joint Histogram

In addition or as an alternative to using the extracted features to compute a joint histogram 520, a weighting factor may be applied to a joint histogram 520. Typically, the weighting factor may be used to modify the count for one or more of the vector elements 510 within the joint histogram 520. The weighting factor may be based on one or more features extracted about the image 400, including the features discussed above (e.g., color, edge density, texturedness, gradient magnitude, brightness, and rank). The weighting factor also may be based on new information extracted about the image that differs from the previously extracted information. For example, where the joint histogram features include color, edge density, texturedness, gradient magnitude, brightness, and rank, it is possible to extract some other information, such as centeredness, and to use that other information to generate or invoke a weighting factor.

In one implementation, a centeredness feature may be extracted about each pixel 410 in the image 400 and used as a basis for weighting. The centeredness feature also may be referred to as the "elliptical distance" weight feature, as it is generally used to weight the values of features representing pixels that are closer to the center of an image. Objects closer to the center of an image are often more visually significant than objects closer to the edge of an image. When used to apply a heavier weighting factor to the values of features representing pixels positioned close to the center, this weight feature is useful for identifying images of similar appearance. For example, when searching a database for images that are similar in appearance to another image, it may be possible to identify more visually similar images if more weight is given to the pixels in the center of the image.

Figure 6:
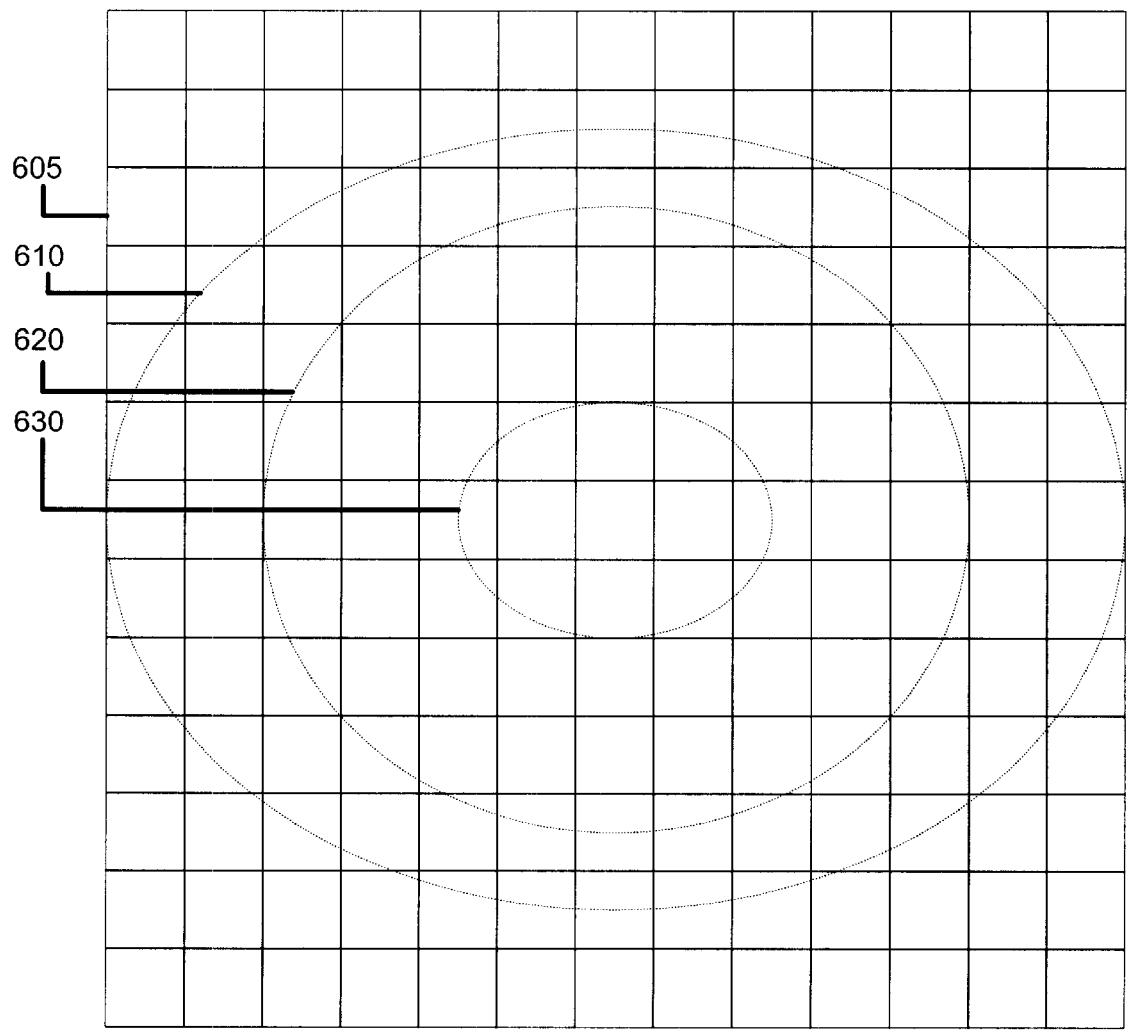
FIG. 6 is a block diagram of a portion of an image.

The weighting factor may be determined on a pixel-by-pixel basis or otherwise. Referring to FIG. 6, one example of determining specific weighting for pixels in an image 600 that is divided into a 13×13 array of pixels includes determining whether the particular pixels are positioned within any of several imaginary concentric ellipses 610, 620, and 630. In this implementation, three imaginary ellipses 610, 620, and 630 surround the center point of image 600. The three ellipses may vary in the width and height of their axes, respectively, although the ellipses generally remain concentric. Each pixel in the image 600 is assigned one of four possible weights based on the position of the pixel relative to the ellipses. For instance, a pixel located between the outer ellipse 610 and the edge 605 of the image 600 may be assigned a weight of one. Thus, when this pixel is used to increment an appropriate vector element in the joint histogram, which is based on the combination of the other extracted features, that vector element will be incremented by a count of one. Pixels located between the middle ellipse 620 and the outer ellipse 610 also may be assigned a weight of one. Pixels located between the inner ellipse 630 and the middle ellipse 620 may be assigned a weight of two, and pixels located within the inner ellipse 630 may be assigned a weight of four. Other weighting schemes also are possible. For instance, additionally or alternatively, negative weighting factors and/or fractional weighting factors may be applied to the pixels in the image. For example, if a commonly occurring feature is identified, a negative weighting factor may be applied to minimize the visual weight given to the feature.

Any number of other methods may be used to determine how to apply the weighting factor to a particular feature. For example, geometric constructs, other than concentric ellipses, may be used along with various weighting schemes. Additionally or alternatively, a weighting factor may be based upon one or more features that have a particular feature value, such as whether a pixel or area of pixels have a predetermined brightness value. In addition, collection statistics (e.g., heuristics, Gaussian) may be used to determine what features and feature values to use to determine and apply a weighting factor.

In one implementation, the weighting factor may be determined and applied as the joint histogram is being computed, for example, as the features of each pixel are resolved.

Alternatively, the weighting factor may be determined and applied to the joint histogram after the joint histogram has been computed.

Posterizing a Histogram and a Joint Histogram

A histogram may be modified through posterization, a process that takes advantage of variations in the visual characteristics of a feature based on the number and/or weight of pixels that exhibit that feature. A weight may include either or both of a count of pixels or a weighed count of pixels in which a weighting factor has been applied to the count of pixels. Posterizing generally includes dividing at least one vector element within a histogram vector into a number of subsets. For example, variations in the weight of a particular feature for an image generally reflect variations in the visual characteristics of that image. As such, the display of an image having a particular feature with a relatively low weight generally differs from the display of an image having the same feature with a relatively high weight. Yet, images having a feature of similar weight, for example, a relatively low and slightly lower weight, may generate a visually similar display. Accounting for these differences and similarities, the range of weights for a given feature may be divided into subranges, where each subrange includes a set of weights corresponding to features that are visually similar to each other, but different from other subranges of weights corresponding to features that are visually dissimilar to each other.

Generally, the result of the posterization process is a second histogram vector, which includes a vector element corresponding to each vector element subrange generated from the first histogram vector element. The order of the vector elements within the second histogram vector may be arranged according to the weights of the corresponding vector elements in the first histogram, or otherwise. For instance, vector elements may be ordered with the vector elements having the most significant weight first.

Figure 7A:
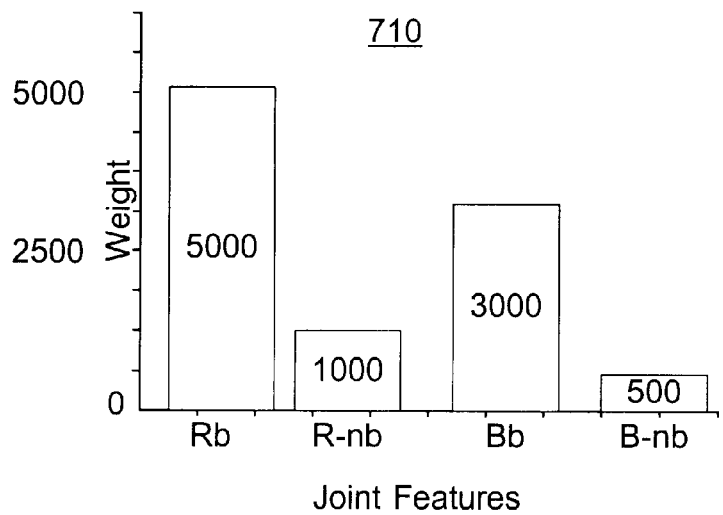
FIG. 7a illustrates a joint histogram graph.

In addition to posterizing a one-dimensional histogram, the posterization process also may be applied to a joint histogram. For example, as shown in FIG. 7a, a joint histogram graph 710 may include four different joint features on the horizontal axis. The vertical axis represents the respective weight of each joint feature of an image (not shown), red-bright (rb), red-non-bright (r-nb), blue-bright (bb), and blue-non-bright (b-nb). In this example, the red-bright (rb) joint feature has a weight of 5000, the red-non-bright (r-nb) joint feature has a weight of 1000, the blue-bright (bb) feature has a weight of 3000, and the blue-non-bright (b-nb) feature has a weight of 500.

Figure 7B:
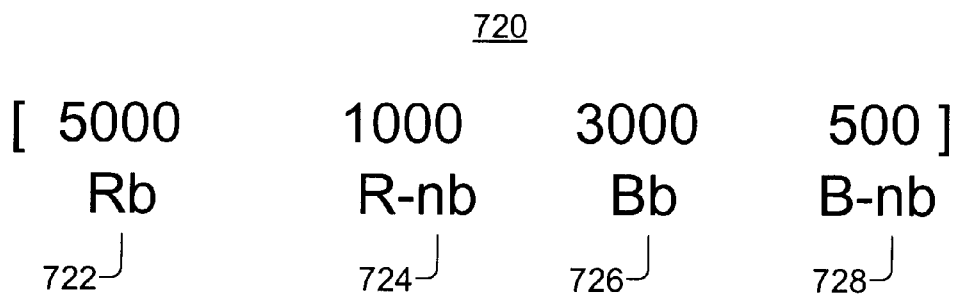

As shown in FIG. 7b, joint histogram vector 720 includes vector elements 722, 724, 726, and 728 respectively corresponding to each joint feature included in joint histogram graph 710 (FIG. 7a). The appropriate weight for each joint feature is included in a corresponding vector element within the joint histogram vector 720.

In this example, some or all of the vector elements may be divided into subranges. For instance, the subranges may be based on the point at which a joint feature of one weight appears visually different than the same joint feature of a different weight. With reference to the implementation of FIG. 7a, a red-bright (rb) joint feature with a weight of 2000 may appear visually different than a red-bright (rb) joint feature with a weight of 5000. Other distinguishing criteria also may be used, for example, using statistics or collection statistics.

Figure 7C:
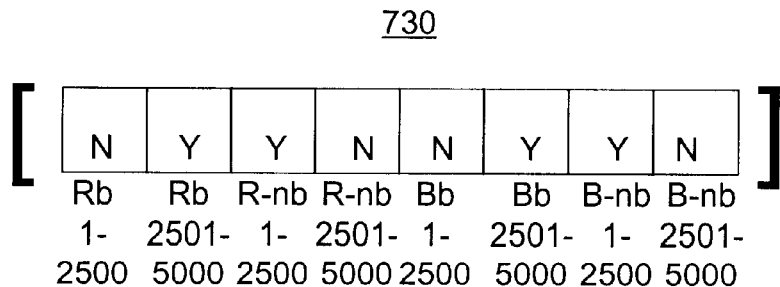
FIG. 7c illustrates a posterized joint histogram vector corresponding to the joint histogram graph of FIG. 7a and the joint histogram vector of FIG. 7b.

In order to realize these distinctions, a second joint histogram vector may be created, as shown in FIG. 7c. The second joint histogram vector 730 includes a vector element for each joint feature subset. In the example provided with respect to FIG. 7c, the red-bright (rb) joint feature with a weight between 1 and 2500 may define one vector element, the red-bright (rb) joint feature with a weight between 2501 and 5000 may define another vector element, and the red-non-bright (r-nb) joint feature with a weight between 1 and 2500 may define yet another vector element, as shown, for instance, by second joint histogram vector 730. However, the ranges defined by these example subsets are arbitrary; other ranges may be used to provide more meaningful search feedback when appropriate.

In this manner, using posterized joint histograms, relevant distinctions among values for joint features may be recognized through the mere inclusion or non-inclusion within a posterized joint histogram vector element. Thus, unlike the first joint histogram vector 720 (FIG. 7b), the vector elements within second joint histogram vector 730 (FIG. 7c) need not include values that represent the weight of particular joint features. Instead, the vector element within the second joint histogram vector may include a mere notation (e.g., a symbol or binary number) that indicates whether or not that particular joint feature with that specified subset of weights is present in the image. For example, with respect to FIG. 7c, the subset of the red-bright (rb) vector element having a weight range of 1–2500 is marked by a "N" (e.g., binary "0") because the particular image used to generate joint histogram vector 720 does not include the red-bright (rb) subset of the joint feature having a weight of between 1–2500. By contrast, the subset of the red-bright (rb) vector element having a weight range of 2501–5000 is marked by a "Y" (e.g., binary "1") because the image includes the red-bright (rb) joint feature with a weight of between 2501–5000. Such a representation enables binary comparison of a posterized joint histogram for searchable data (e.g., image, text) against posterized joint histograms for other searchable data.

Each joint feature may or may not be divided into subsets according to weight. Additionally or alternatively, different joint features may be divided into different numbers of subsets, where one joint feature may include more or less subsets than another joint feature. For instance, one joint feature may have more or less visual significance than another joint feature generating a need for more or less subsets.

The division of joint features into subsets may be determined empirically in accordance with human perception, e.g., by a computer. Moreover, statistics and/or collection statistics may be used to determine the points at which to divide joint features into subsets.

A posterized joint histogram may include a joint histogram in which a weighting factor has been applied. In one implementation, the posterized joint histogram is calculated after the weighting factor has been applied to the joint histogram.

Dividing the joint histogram into a posterized joint histogram may be useful in various applications, such as an image search and retrieval system.

Applying Text Methodology to Image Searching Using Joint Histograms

Image searching, indexing, and retrieval may be performed in a number of different applications, for example, as part of an online system operated by a web host having members. Other applications may include, for instance, searching electronic information within an electronic data store, where the electronic information includes indexed images; searching photographic archives; filtering search results; and human feature recognition (e.g., facial recognition).

Performing an image search generally includes receiving a set of features corresponding to image characteristics, comparing the received set of features to features that have been indexed for multiple stored images, and producing a search result based on the comparison. The search may be performed, for example, by a web host, an Internet Service Provider, a computer, or computer software operating on a computer or across a number of computers.

The set of features that are received as input may include posterized histogram features, joint histogram features, posterized joint histogram features, weighted joint histogram features, and any other combination of posterized, weighted and/or joint histogram features. Additionally or alternatively, the received set of features may include data in a text, audio, visual, or graphical format, or any combination of these formats or other formats, which may be converted into a posterized histogram, a joint histogram, a posterized joint histogram, a weighted joint histogram, and any other combination of posterized, weighted and/or joint histogram features.

The received features may be entered in a graphical user interface as part of a query in an online search engine, which may include one or more of the formats discussed above. For example, where the received features are entered as a text string, the received text may correspond to image characteristics. Alternatively, the received set of features may be received by clicking on an image or a portion of an image that is displayed on the computer screen of a user, where the received set of features may include all or only a portion of an image that is designated by the user. The set of features also may be received by a voice command, for example, a voice command spoken into a microphone attached to an electronic device, or by drawing on a screen (e.g., a touch screen).

When at least a portion of an image is received, the features of the image that correspond to searchable image characteristics are identified. If the received image does not have a corresponding joint histogram, then a joint histogram is computed for the received image based on the features identified as corresponding to the searchable image characteristics. The joint histogram that is computed also may include a joint histogram to which a weighting factor has been applied, such as a weighting factor based on a centeredness feature. Additionally or alternatively, a posterized joint histogram may be computed for the received image. The features of the received image may be identified by extracting the features from each pixel in the image.

After receiving or resolving a set of features, the received set of features are compared to features that have been indexed for multiple stored images. A text search methodology may be used to compare the set of features to features that have been indexed for multiple stored images. For example, where multiple stored images are indexed based on associated features using an inverted indexing method, the received features may be matched against the features that are included as part of an inverted index.

Figure 8:
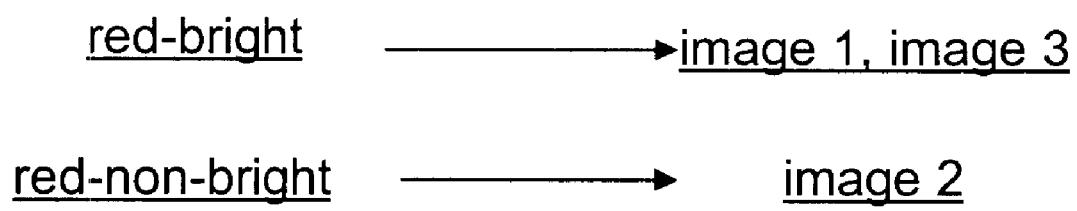
FIG. 8 illustrates images indexed using an inverted index.

Generally, in an inverted index, a relationship exists between features and images that include those features. The set of features also may include a list of features, where the list of features includes a relationship between the features and images including those features. For example, the indexed features or the list of the indexed features may include information or may point to information that identifies images that include the features. An example of an inverted index is shown by FIG. 8, where the red-bright and red-non-bright features are shown as corresponding to, for example, three arbitrary images. The index also may include any other type of additional information regarding the images, such as weights, and/or other characteristics, which may be used for similarity metrics, as described below.

Based on a comparison against the inverted index of the received features or information reflective of the received features, a search result is produced. The search result may include a set of images for display in a ranked manner. The set of images is generally ranked in order from an image that is most relevant to the received set of features to an image that is least relevant to the received set of features. The decision on which images are retrieved and the order that the images are displayed may be determined based on similarity metrics or otherwise. Similarity metrics may include one or more different techniques, for example, a Boolean model, a vector element model, a probabilistic model, latent semantic indexing, neural networks, genetic algorithms, and fuzzy set retrieval. These and other techniques may be applied to text retrieval systems to retrieve images as described. In general, the highest ranked results will be the retrieved images that include the largest number of received features or the highest proportion of important features.

Figure 9:
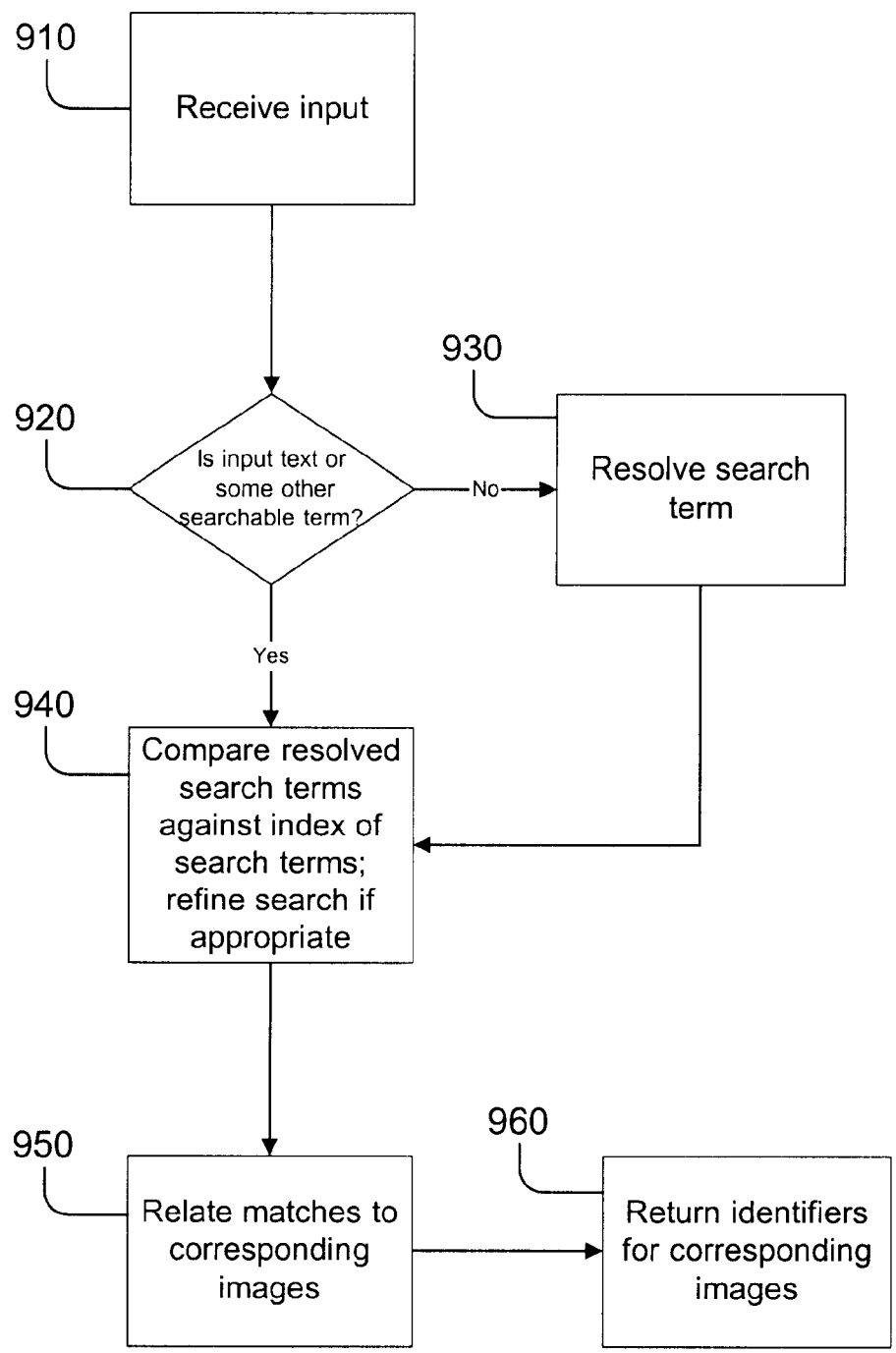
FIG. 9 is a flow chart of a process for performing an image and/or a text search.

With reference to FIG. 9, in one implementation, a user of an online system may enter a text string as part of a query in a graphical user interface that is associated with a search engine (step 910). A determination may be made as to whether the input is in a searchable format (step 920). If the input is not in a searchable format, then the input may be resolved into a format that is searchable (step 930). The text string may be compared against searchable text metadata (step 940), and matching searchable text metadata may be indexed with corresponding images (step 950). The search may produce a result that includes a ranked list of images that were identified during the comparison (step 960).

Based on the list of images that are produced, the user of the online system may further refine the search for other images by selecting (e.g., clicking on) one of the images that was produced in step 960 as an input to restart the search process of FIG. 9. In this instance, the produced image is used to generate searchable criteria as necessary, for example, by associating the image with a respective joint histogram (steps 920–930). The joint histogram for the image generally includes a weighted joint histogram, a posterized joint histogram, and any other combination of posterized, weighted and/or joint histograms. The joint histogram of the image that was selected then is compared with the index of joint features (step 940). The joint features identified through the comparison may be related to images that include the same features as the selected image, e.g., via the inverted index (step 950). Indexed images that include the same features then are retrieved using similarity metrics to determine which of the matching images to display and the order in which to display them (step 960).

In another implementation, the set of received features (step 910) may include a set of features corresponding to posterized image characteristics. In this instance, the received set of images are compared (step 940) to features that have been indexed and that correspond to posterized image characteristics for multiple stored images.

Indexing images for use in a searchable and/or inverted index may include receiving an image, computing a joint histogram that includes a set of joint features for the image, and creating an index of the joint features and/or weights within the joint histogram using an index methodology. Typically, the index is searchable.

Indexing images for use in a searchable and/or inverted index also may include receiving an image, computing a posterized joint histogram that includes a set of posterized joint features for the image, and creating an index of posterized joint features within the posterized joint histogram using an index methodology. Typically, the index is searchable.

The index methodology may include, for example, an inverted index. In this example, the inverted index may include a list of joint features that each are associated with images that include a corresponding particular joint feature. Typically, the inverted index may include information that indicates which images include that joint feature, where the image is located, and/or what portion of the image includes the joint feature. Additionally or alternatively, the index may include a list of posterized histogram features, posterized joint histogram features, and any other feature that may be searched, along with a list of documents including that feature.

Searching Text and Images Based on a Single Format

A single search may be performed for both text and images. In this case, inputs generally include (step 910) or are resolved to include (step 930) one or more features corresponding to image characteristics and text search terms. The inputs are compared against features and text terms (step 940) for stored images and documents that have been indexed in a searchable format (generally a single format) (step 950), and a search result is produced based on the comparison (step 960).

The set of features that are received as input (step 910) may include a posterized histogram, a joint histogram, a posterized joint histogram, a weighted joint histogram, and other combinations of posterized, weighted and/or joint histograms. Other inputs may include an image, an image portion, a graphic, a drawing, other searchable formats, and any combination of these. If necessary, these other inputs may be resolved into histogram-type formats (step 930).

Features associated with joint histograms, posterized joint histogram, weighted joint histograms, and other combinations of posterized, weighted, and/or joint histograms may be indexed in a data format typically used to index text. One example of such an index includes an inverted index. These type of features may be indexed in an inverted index at least for the reason that the features of an image or portion of an image may be treated like words that are a part of a document. For example, the features of a posterized joint histogram include a unique identifier corresponding to a particular posterized joint feature. The unique identifiers are indexed and each index entry points to all of the images that include the particular identifier for that entry.

In an implementation, the inverted index includes in the same index both an index of features corresponding to images and documents and an index of words corresponding to images and documents.

Figure 10:
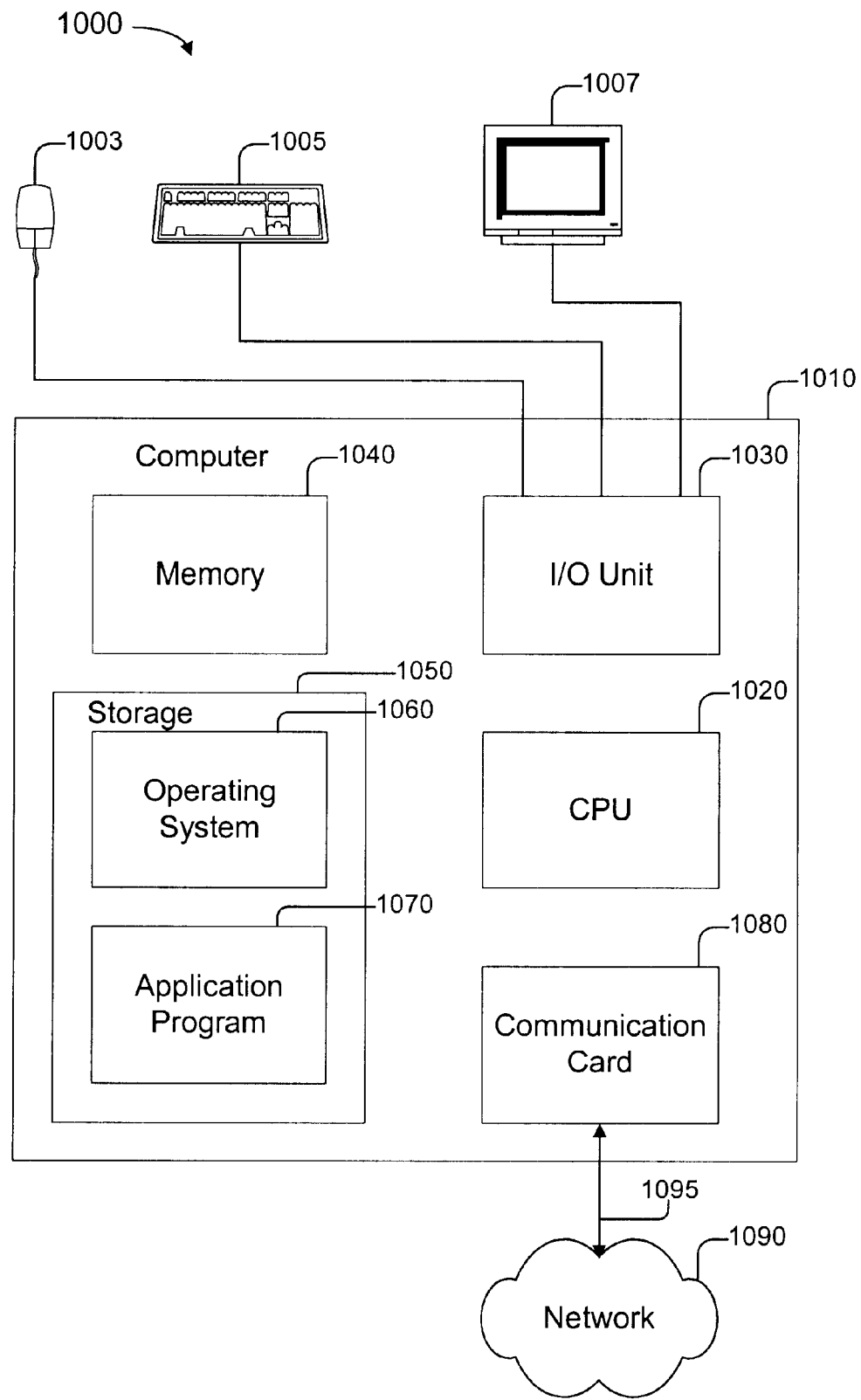
FIG. 10 is a block diagram of a general computer system.

Referring to FIG. 10, exemplary components 1000 of a system that may be used to search, retrieve, and index images and/or text, such as a computer system, is shown. The hardware setup may include various input/output (I/O) devices (e.g., mouse 1003, keyboard 1005, and display 1007) and general purpose computer 1010 having central processor unit (CPU) 1020, I/O unit 1030, memory 1040, and storage 1050 that stores data and various programs such as operating system 1060 and one or more application programs 1070. Computer system 1010 also typically includes some sort of communications card or device 1080 (e.g., a modem or a network adapter) for exchanging data with a network 1090 via a communications link 1095 (e.g., a telephone line, a wireless network link, a cable network). Other examples of system 1000 include a workstation, a server, a device, a component, other equipment of some combination thereof capable of responding to and executing instructions in a defined manner.

Figure 11A:
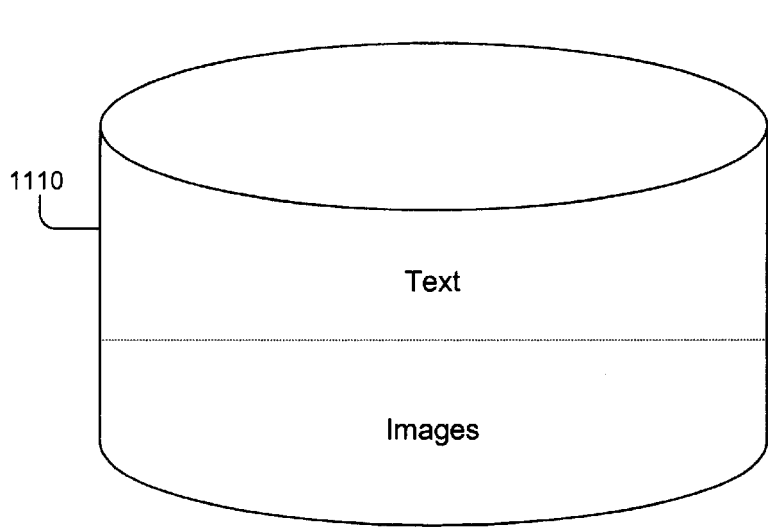
FIG. 11a is a block diagram of a storage device.
Figure 11B:
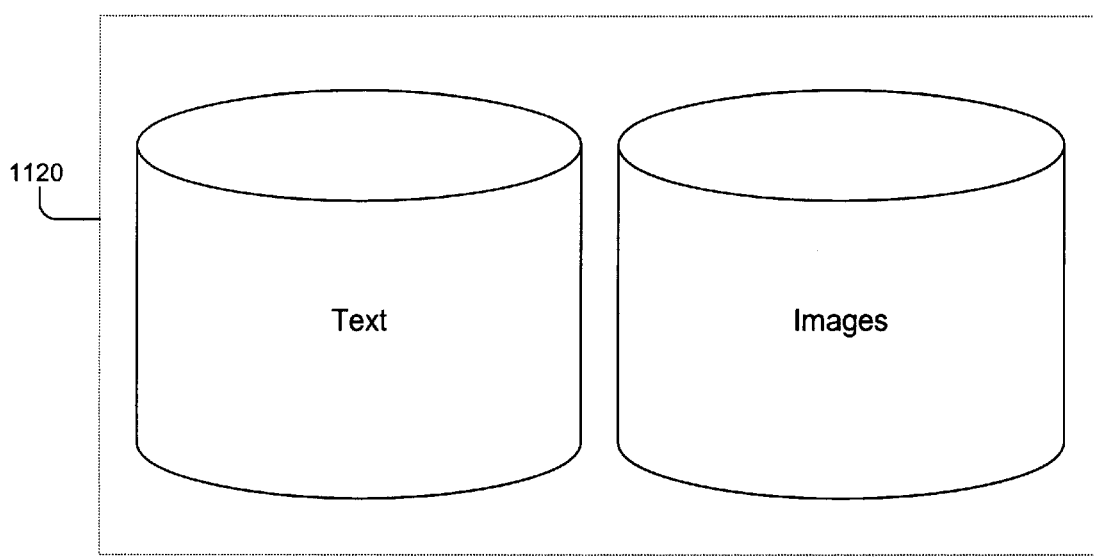
FIG. 11b is a block diagram of multiple storage devices.

Referring to FIG. 11a, images and text may be stored in a single storage or memory device 1110, which may include a logical separation for the different types of data (e.g., images and text) within the device 1110. Additionally or alternatively, images and text may be stored in physically separate storage and/or memory devices 1120, as shown with reference to FIG. 11b.

The systems, methods, and techniques described here may be implemented in digital electronic circuitry, or in computer hardware, firmware, software, or in combinations of them. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

Other implementations are within the scope of the following claims.

What is claimed is:

1. A method for representing an image, the method comprising:

extracting information reflecting one or more characteristics of an image;

computing a first histogram vector based on the information extracted, wherein the first histogram vector includes one or more vector elements, each representing information for a different characteristic extracted for the image;

identifying multiple subsets within at least one of the vector elements included in the first histogram vector, wherein the multiple subsets represent a range for a count of pixels for the vector element; and creating a second histogram vector that includes a vector element for each of the subsets identified within the vector elements included in the first histogram vector, wherein data within the vector elements of the second histogram vector represent the image characteristics extracted.

2. The method as in claim 1 wherein the first histogram vector is computed based on the information extracted, with the first histogram vector including one or more vector elements that each represent information for a different combination of characteristics extracted for the image.

3. The method as in claim 1 further comprising applying a weighting factor to the first histogram vector.

4. A method for representing an image, the method comprising:

extracting information about an image;

computing a histogram having one or more elements based on the information extracted about the image;

identifying multiple subsets within at least one of the elements of the histogram, wherein the multiple subsets represent a range for a count of pixels for the element; and calculating based on the histogram and the subsets a posterized histogram that represents the image.

5. The method as in claim 4 wherein:

extracting information includes extracting more than one type of information about the image;

computing the histogram includes computing a joint histogram having one or more elements based on the more than one type of information;

identifying the multiple subsets includes identifying multiple subsets within at least one of the elements of the joint histogram, wherein the multiple subsets represent a range for a count of pixels for the element; and calculating the posterized histogram includes calculating a posterized joint histogram based on the joint histogram and the subsets.

6. The method as in claim 5 further comprising applying a weighting factor to a selected element in the joint histogram based on at least one type of information extracted about the image before calculating the posterized joint histogram such that the joint histogram represents a weighted joint histogram that reflects application of the weighting factor, wherein the multiple subsets represent a range for a weighted count of pixels for the selected element and calculating the posterized joint histogram includes calculating based on the weighted joint histogram and the subsets.

7. The method as in claim 6 wherein the weighting factor is applied to the joint histogram based on more than one type of information extracted about the image.

8. The method as in claim 6 wherein applying the weighting factor includes:

extracting one or more additional types of information about the image that differ from the types of information used to compute the histogram; and determining whether to modify the element in the joint histogram based on the additional types of information extracted about the image.

9. The method as in claim 8 wherein extracting one or more additional types of information includes extracting a centeredness feature about each pixel in the image and the determining includes determining whether to modify the one or more elements in the joint histogram based on the centeredness feature extracted about each pixel in the image.

10. The method as in claim 5 further comprising applying a weighting factor to a selected element in the joint histogram based on at least one type of information extracted about the image that differs from the types of information used to compute the joint histogram before calculating the posterized joint histogram such that the joint histogram represents a weighted joint histogram that reflects application of the weighting factor, wherein the multiple subsets represent a range for a weighted count of pixels for the selected element and calculating the posterized joint histogram includes calculating based on the weighted joint histogram and the subsets.

11. The method as in claim 10 wherein the weighting factor is applied to the joint histogram based on more than one type of information extracted about the image that differs from the types of information used to compute the joint histogram.

12. The method as in claim 4 wherein the extracted information includes at least one feature of the image.

13. The method as in claim 4 wherein the extracted information includes more than one feature of the image.

14. The method as in claim 13 wherein the extracted information includes at least one of color, edge density, texturedness, gradient magnitude, and rank features about pixels in the image.

15. The method as in claim 13 wherein the extracted information includes more than one of color, edge density, texturedness, gradient magnitude, and rank features about pixels in the image.

16. The method as in claim 4 wherein:

computing the histogram includes computing a first histogram vector based on information extracted about the image, and the first histogram vector includes one or more vector elements that each represent information for a different feature extracted about the image.

17. The method as in claim 16 wherein calculating the posterized histogram includes:

creating a second histogram vector that includes a vector element for each of the subsets identified within the vector elements included in the first histogram vector; and data within the vector elements of the second histogram vector represent the image features extracted.

18. The method as in claim 16 wherein computing the first histogram vector includes computing a first histogram vector based on the types of information extracted about the image, the first histogram vector including one or more vector elements each representing information for a different combination of features extracted about the image.

19. A computer program stored on a computer readable medium or a propagated signal for representing an image, the computer program comprising:

an extracting code segment that causes the computer to extract information about an image;

a computing code segment that causes the computer to compute a histogram having one or more elements based on the information extracted about the image;

an identifying code segment that causes the computer to identify multiple subsets within at least one of the elements of the histogram, wherein the multiple subsets represent a range for a count of pixels for the element; and a calculating code segment that causes the computer to calculate a posterized histogram that represents the image based on the histogram and the subsets.

20. The computer program of claim 19 wherein:

the extracting code segment includes a code segment that causes the computer to extract more than one type of information about the image;

the computing code segment includes a code segment that causes the computer to compute a joint histogram having one or more elements based on the more than one type of information;

the identifying code segment includes a code segment that causes the computer to identify multiple subsets within at least one of the elements of the joint histogram, wherein the multiple subsets represent a range for a count of pixels for the element; and the calculating code segment includes a code segment that causes the computer to calculate a posterized joint histogram based on the joint histogram.

21. The computer program of claim 20 further comprising a weighting code segment that causes the computer to apply a weighting factor to a selected element in the joint histogram based on at least one type of information extracted about the image before calculating the posterized joint histogram such that the joint histogram represents a weighted joint histogram that reflects application of the weighting factor, wherein the multiple subsets represent a range for a weighted count of pixels for the selected element and the calculating code segment includes a code segment that causes the computer to calculate based on the weighted joint histogram and the subsets.

22. The computer program of claim 21 wherein the weighting code segment includes a code segment that causes the computer to apply the weighting factor to the joint histogram based on more than one type of information extracted about the image.

23. The computer program of claim 21 wherein the weighting code segment includes:

a code segment that causes the computer to extract one or more additional types of information about the image that differ from the types of information used to compute the histogram; and a code segment that causes the computer to determine whether to modify the element in the joint histogram based on the additional types of information extracted about the image.

24. The computer program of claim 20 further comprising a weighting code segment that causes the computer to apply a weighting factor to a selected element in the joint histogram based on at least one type of information extracted about the image that differs from the types of information used to compute the joint histogram before calculating the posterized joint histogram such that the joint histogram represents a weighted joint histogram that reflects application of the weighting factor, wherein the multiple subsets represent a range for a weighted count of pixels for the selected element and the calculating code segment includes a code segment that causes the computer to calculate based on the weighted joint histogram and the subsets.

25. The computer program of claim 24 wherein the weighting code segment includes a code segment that causes the computer to apply the weighting factor to the joint histogram based on more than one type of information extracted about the image that differs from the types of information used to compute the joint histogram.

26. The computer program of claim 19 wherein the extracted information includes at least one feature of the image.

27. The computer program of claim 19 wherein the extracted information includes more than one feature of the image.

28. The computer program of claim 19 wherein the computing code segment includes a code segment that causes the computer to compute a first histogram vector based on information extracted about the image, wherein the first histogram vector includes one or more vector elements, each representing information for a different feature extracted about the image.

29. The computer program of claim 28 wherein the calculating code segment includes:

a code segment that causes the computer to create a second histogram vector that includes a vector element for each of the subsets identified within the vector elements included in the first histogram vector, with data within the vector elements of the second histogram vector representing the image features extracted.

30. The computer program of claim 28 wherein:

the computing includes a code segment that causes the computer to compute a first histogram vector based on the types of information extracted about the image, and the first histogram vector includes one or more vector elements each representing information for a different combination of features extracted about the image.

31. A computer program stored on a computer readable medium or a propagated signal for representing an image, the computer program comprising:

a code segment that causes the computer to extract information reflecting one or more characteristics of an image;

a code segment that causes the computer to compute a first histogram vector based on the information extracted, wherein the first histogram vector includes one or more vector elements, each representing information for a different characteristic extracted about the image;

a code segment that causes the computer to identify multiple subsets within at least one of the vector elements included in the first histogram vector, wherein the multiple subsets represent a range for a count of pixels for the vector element; and a code segment that causes the computer to create a second histogram vector that includes a vector element for each of the subsets identified within the vector elements included in the first histogram vector, wherein data within the vector elements of the second histogram vector represent the image characteristics extracted.

32. The computer program of claim 31 wherein the code segment that causes the computer to compute includes a code segment that causes the computer to compute the first histogram vector based on the information extracted, the first histogram vector including one or more vector elements, each representing information for a different combination of characteristics extracted about the image.

33. The computer program of claim 31 further comprising a weighting code segment that causes the computer to apply a weighting factor to the first histogram vector.

34. A system for representing an image, the system comprising:

an extracting component that is structured and arranged to extract information about an image;

a computing component that is structured and arranged to compute a histogram having one or more elements based on the information extracted about the image;

an identifying component that is structured and arranged to identify multiple subsets within at least one of the elements of the histogram, wherein the multiple subsets represent a range for a count of pixels for the element; and a calculating component that is structured and arranged to calculate a posterized histogram that represents the image based on the histogram and the subsets.

35. The system of claim 34 wherein:

the extracting component extracts more than one type of information about the image;

the computing component computes a joint histogram based on the more than one type of information;

the identifying component identifies multiple subsets within at least one of the elements of the joint histogram, wherein the multiple subsets represent a range for a count of pixels for the element; and the calculating component calculates a posterized joint histogram based on the joint histogram and the subsets.

36. The system of claim 35 further comprising a weighting component that is structured and arranged to apply a weighting factor to a selected element in the joint histogram based on at least one type of information extracted about the image before calculating the posterized joint histogram such that the joint histogram represents a weighted joint histogram that reflects application of the weighting factor, wherein the multiple subsets represent a range for a weighted count of pixels for the selected element and the calculating component calculates the posterized joint histogram based on the weighted joint histogram and the subsets.

37. The system of claim 36 wherein the weighting component is structured and arranged to apply the weighting factor to the joint histogram based on more than one type of information extracted about the image.

38. The system of claim 36 wherein:

the extracting component extracts one or more additional types of information about the image that differ from the types of information used to compute the histogram; and the weighting component determines whether to modify the element in the joint histogram based on the additional types of information extracted about the image.

39. The system of claim 35 further comprising a weighting component that is structured and arranged to apply a weighting factor to a selected element in the joint histogram based on at least one type of information extracted about the image that differs from the types of information used to compute the joint histogram before calculating the posterized joint histogram such that the joint histogram represents a weighted joint histogram that reflects application of the weighting factor, wherein the multiple subsets represent a range for a weighted count of pixels for the selected element and the calculating component calculates the posterized joint histogram based on the weighted joint histogram and the subsets.

40. The system of claim 39 wherein the weighting component is structured and arranged to apply the weighting factor to the joint histogram based on more than one type of information extracted about the image that differs from the types of information used to compute the joint histogram.

41. The system of claim 34 wherein:

the computing component computes a first histogram vector based on information extracted about the image, and the first histogram vector includes one or more vector elements, each representing information for a different feature extracted about the image.

42. The system of claim 41 wherein:

the calculating component is structured and arranged to create a second histogram vector that includes a vector element for each of the subsets identified within the vector elements included in the first histogram vector, and data within the vector elements of the second histogram vector represent the image features extracted.

43. The system of claim 41 wherein:

the computing component computes a first histogram vector based on the types of information extracted about the image, and the first histogram vector includes one or more vector elements, each representing information for a different combination of features extracted about the image.

44. A system for representing an image, the system comprising:

an extracting component that is structured and arranged to extract information reflecting one or more characteristics of an image;

a computing component that is structured and arranged to compute a first histogram vector based on the information extracted, wherein the first histogram vector includes one or more vector elements, each representing information for a different characteristic extracted about the image;

an identifying component that is structured and arranged to identify multiple subsets within at least one of the vector elements included in the first histogram vector, wherein the multiple subsets represent a range for a count of pixels for the vector element; and a creating component that is structured and arranged to create a second histogram vector that includes a vector element for each of the subsets identified within the vector elements included in the first histogram vector, wherein data within the vector elements of the second histogram vector represent the image characteristics extracted.

45. The system of claim 44 wherein the computing component is structured and arranged to compute the first histogram vector based on the information extracted, the first histogram including one or more vector elements, each representing information for a different combination of characteristics extracted about the image.

46. The system of claim 44 further comprising a weighting component that is structured and arranged to apply a weighting factor to the first histogram vector.

47. The method as in claim 1 wherein the extracted characteristics include at least one of color, edge density, texturedness, gradient magnitude, and rank features about pixels in the image.

48. The method as in claim 1 wherein the extracted characteristics include more than one of color, edge density, texturedness, gradient magnitude, and rank features about pixels in the image.

* * * * *